United States Patent
Shveidel et al.

(10) Patent No.: US 11,616,722 B2
(45) Date of Patent: Mar. 28, 2023

(54) STORAGE SYSTEM WITH ADAPTIVE FLOW CONTROL USING MULTIPLE FEEDBACK LOOPS

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 308 days.

(21) Appl. No.: 17/077,559

(22) Filed: Oct. 22, 2020

(65) Prior Publication Data

US 2022/0131802 A1 Apr. 28, 2022

(51) Int. Cl.
*G01R 31/08* (2020.01)
*H04L 47/11* (2022.01)
(Continued)

(52) U.S. Cl.
CPC ............ *H04L 47/11* (2013.01); *G06F 3/0605* (2013.01); *G06F 3/0611* (2013.01);
(Continued)

(58) Field of Classification Search
CPC ......... H04L 47/11; H04L 47/27; H04L 47/28; G06F 3/0605; G06F 3/0611;
(Continued)

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |

(Continued)

FOREIGN PATENT DOCUMENTS

| | | |
|---|---|---|
| WO | 2016111954 A1 | 7/2016 |
| WO | PCT/US2019/024885 | 1/2020 |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Thuy N Pardo
(74) *Attorney, Agent, or Firm* — Ryan, Mason & Lewis, LLP

(57) ABSTRACT

At least one processing device comprises a processor and a memory coupled to the processor. The at least one processing device is configured to implement adaptive flow control in conjunction with processing of input-output operations in a storage system. The adaptive flow control comprises a first feedback loop in which a window size defining an amount of concurrent processing of the input-output operations in the storage system is adjusted responsive to a measured latency for processing of one or more of the input-output operations. The adaptive flow control further comprises a second feedback loop in which at least one latency threshold (Continued)

used to control adjustment of the window size in the first feedback loop is adjusted. The at least one processing device illustratively comprises at least one processing core of a multi-core storage node of a distributed storage system.

20 Claims, 7 Drawing Sheets

(51) Int. Cl.
  *H04L 47/27* (2022.01)
  *G06F 3/06* (2006.01)
  *H04L 47/28* (2022.01)
(52) U.S. Cl.
  CPC ............ *G06F 3/0617* (2013.01); *H04L 47/27* (2013.01); *H04L 47/28* (2013.01)
(58) Field of Classification Search
  CPC .... G06F 3/0617; G06F 3/0613; G06F 3/0658; G06F 3/0683
  USPC .......................... 370/235, 222, 224
  See application file for complete search history.

(56) References Cited

U.S. PATENT DOCUMENTS

| | | |
|---|---|---|
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 9,983,937 B1 | 5/2018 | Shveidel |
| 10,048,874 B1 | 8/2018 | Shveidel et al. |
| 10,152,232 B1 | 12/2018 | Kleiner et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,474,496 B1 | 11/2019 | Kamran et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Strange |
| 10,754,736 B2 | 8/2020 | Shani et al. |
| 10,761,933 B2 | 9/2020 | Moore et al. |
| 10,783,038 B2 | 9/2020 | Moore et al. |
| 2005/0047260 A1* | 3/2005 | Yamasaki .............. G11C 29/20 365/232 |
| 2007/0022121 A1 | 1/2007 | Bahar et al. |
| 2007/0050504 A1 | 3/2007 | Gomez et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2010/0315255 A1 | 12/2010 | Chang et al. |
| 2011/0022566 A1 | 1/2011 | Beaverson et al. |
| 2011/0225123 A1 | 9/2011 | D'Souza et al. |
| 2012/0008793 A1* | 1/2012 | Knox .................. H04R 1/1091 381/74 |
| 2012/0124282 A1 | 5/2012 | Frank et al. |
| 2012/0236845 A1* | 9/2012 | Li ....................... H04L 65/1069 370/352 |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0218223 A1* | 8/2014 | Darshan ................ H03M 3/39 341/143 |
| 2014/0244935 A1 | 8/2014 | Ezra et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0308539 A1* | 10/2016 | Chen ...................... H03L 7/099 |
| 2016/0345207 A1 | 11/2016 | Kwak et al. |
| 2017/0075842 A1 | 3/2017 | Su et al. |
| 2017/0085183 A1* | 3/2017 | Notsch .................... H02M 1/44 |
| 2017/0115894 A1* | 4/2017 | Sterns ................. G06F 3/0635 |
| 2017/0185529 A1 | 6/2017 | Chhabra et al. |
| 2017/0192857 A1 | 7/2017 | Meiri et al. |
| 2017/0286294 A1* | 10/2017 | Trika ................. G06F 12/0886 |
| 2017/0309929 A1* | 10/2017 | Moghimi .......... H01M 8/04328 |
| 2017/0337375 A1* | 11/2017 | Quinlan ................. G06F 21/53 |
| 2018/0039653 A1* | 2/2018 | Bailey .................. G06F 16/119 |
| 2018/0039654 A1* | 2/2018 | Rodrigues ........... H04L 67/1097 |
| 2018/0095873 A1 | 4/2018 | Nakagoe et al. |
| 2018/0185533 A1* | 7/2018 | Lalicki ....................... A61L 2/10 |
| 2018/0246189 A1* | 8/2018 | Smits ................... G01S 17/003 |
| 2019/0163221 A1* | 5/2019 | Nishino ................ G01R 31/28 |
| 2019/0179761 A1* | 6/2019 | Gupta ................ G06F 12/0871 |
| 2019/0250848 A1* | 8/2019 | Benisty ................ G06F 3/0659 |
| 2019/0303490 A1 | 10/2019 | Chen et al. |
| 2019/0332314 A1 | 10/2019 | Zhang et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0262726 A1* | 8/2020 | Munk-Nielsen ...... C02F 1/5209 |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |

(56) References Cited

U.S. PATENT DOCUMENTS

| | | | |
|---|---|---|---|
| 2020/0326877 A1 | 10/2020 | Chen et al. | |
| 2020/0327024 A1 | 10/2020 | Alkalay et al. | |
| 2021/0294669 A1* | 9/2021 | Bimberg | G06F 9/5016 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

NVM Express, "NVM Express, Revision 1.3," NVM Express, May 1, 2017, 282 pages.

U.S. Appl. No. 15/662,708 filed in the name of Xiangping Chen et al. filed Jul. 28, 2017, and entitled "Token-Based Data Flow Control in a Clustered Storage System."

U.S. Appl. No. 15/793,121 filed in the name of David Meiri et al. filed Oct. 25, 2017, and entitled "Opportunistic Compression of Replicated Data in a Content Addressable Storage System."

U.S. Appl. No. 15/824,536 filed in the name of Christopher Sayles et al. filed Nov. 28, 2017, and entitled "Storage System with Asynchronous Messaging between Processing Modules for Data Replication."

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. filed Apr. 29, 2019, and entitled "Storage System with Deduplication-Aware Replication Implemented Using a Standard Storage Command Protocol."

U.S. Appl. No. 16/413,050 filed in the name of Xiangping Chen et al. filed May 15, 2019, and entitled "Storage System with Coordinated Recovery across Multiple Input-Output Journals of Different Types."

U.S. Appl. No. 16/530,121 filed in the name of Anton Kucherov et al. filed Aug. 2, 2019, and entitled "Memory-Efficient Processing of Raid Metadata Bitmaps."

U.S. Appl. No. 16/663,524 filed in the name of Xiangping Chen et al. filed Oct. 25, 2019, and entitled "Storage System with Throughput-Based Timing of Synchronous Replication Recovery."

U.S. Appl. No. 16/665,651 filed in the name of Lior Kamran et al. filed Oct. 28, 2019, and entitled "Recovery Flow with Reduced Address Lock Contention in a Content Addressable Storage System."

U.S. Appl. No. 16/671,824 filed in the name of Lior Kamran et al. filed Nov. 1, 2019, and entitled "Storage System Capacity Expansion Using Mixed-Capacity Storage Devices."

U.S. Appl. No. 16/693,858 filed in the name of Doron Tai filed Nov. 25, 2019, and entitled "Storage System with Prioritized RAID Rebuild."

U.S. Appl. No. 16/915,380 filed in the name of Vladimir Shveidel et al. filed Jun. 29, 2020, and entitled "End-to-End Quality of Service Mechanism for Storage System Using Prioritized Thread Queues."

U.S. Appl. No. 16/747,138 filed in the name of Lior Kamran et al. filed Jan. 20, 2020, and entitled "Performance Monitoring for Storage System with Core Thread Comprising Internal and External Schedulers."

\* cited by examiner

STORAGE SYSTEM WITH ADAPTIVE FLOW CONTROL USING MULTIPLE FEEDBACK LOOPS

FIELD

The field relates generally to information processing systems, and more particularly to storage in information processing systems.

BACKGROUND

Information processing systems often include distributed storage systems comprising multiple nodes. Nodes of a distributed storage system may each include multi-core processors that are configured to execute threads associated with various applications. One or more processing cores of a given such multi-core processor illustratively execute the threads associated with a particular application. Performance monitoring techniques are typically used to monitor the performance of such core threads in these and other contexts, but excessive latencies may nonetheless arise when a given processing core is used to execute multiple threads of one or more applications. A need therefore exists for limiting latency or providing other performance guarantees in conjunction with threads executing on one or more processing cores in a distributed storage system.

SUMMARY

Illustrative embodiments provide storage systems that implement adaptive flow control using multiple feedback loops. For example, some embodiments disclosed herein are advantageously configured to facilitate accurate and efficient flow control under both short-term and long-term variations in input-output (IO) patterns and other conditions. Such arrangements can allow a given storage system to provide limited latencies or other performance guarantees in processing IO operations of one or more applications while also achieving higher levels of processing throughput than would otherwise be possible.

In one embodiment, at least one processing device comprises a processor coupled to a memory, and is configured to implement adaptive flow control in conjunction with processing of IO operations in a storage system. The adaptive flow control comprises a first feedback loop in which a window size defining an amount of concurrent processing of the IO operations in the storage system is adjusted responsive to a measured latency for processing of one or more of the IO operations. The adaptive flow control further comprises a second feedback loop in which at least one latency threshold used to control adjustment of the window size in the first feedback loop is adjusted.

Although two feedback loops are used in this embodiment, it is possible in other embodiments to implement adaptive flow control using more than two feedback loops.

In some embodiments, the storage system comprises a distributed storage system that includes a plurality of storage nodes. The above-noted at least one processing device in such an embodiment illustratively comprises at least one processing core of a multi-core storage node of the distributed storage system. Numerous other storage system and processing device arrangements are possible.

The first feedback loop is illustratively configured to decrease the window size responsive to the measured latency being greater than an upper latency threshold and to increase the window size responsive to the measured latency being less than a lower latency threshold, although other configurations of the first feedback loop can be used.

In some embodiments, the measured latency for processing of one or more of the IO operations comprises an average end-to-end latency measured across multiple ones of the IO operations.

The window size in illustrative embodiments defines a maximum permitted amount of concurrent processing of the IO operations in the storage system in terms of a number of data units of a particular size.

The first feedback loop in some embodiments is configured to respond to relatively short-term fluctuations in processing performance of the storage system and the second feedback loop is configured to respond to relatively long-term fluctuations in processing performance of the storage system.

For example, the first feedback loop illustratively comprises a primary feedback loop of the adaptive flow control and the second feedback loop comprises an external feedback loop of the adaptive flow control and is configured to adjust said at least one latency threshold of the primary feedback loop.

In some embodiments, the second feedback loop adjusts said at least one latency threshold of the first feedback loop based at least in part on a designated throughput measure, such as, for example, average IO operations per second (IOPS) measured over a relatively long-term interval as compared to a relatively short-term interval over which the measured latency utilized in the first feedback loop is determined.

The second feedback loop in some embodiments operates over a plurality of cycles each corresponding to a designated feedback time frame for which the second feedback loop determines whether or not said at least one latency threshold of the first feedback loop is to be adjusted. In some arrangements of this type, for each of the designated feedback time frames, the second feedback loop illustratively determines a plurality of measured parameters including, for example, average latency, latency deviation and average IOPS for the feedback time frame.

In some embodiments, for a given one of the feedback time frames, the second feedback loop either decreases said at least one latency threshold of the first feedback loop if the average latency is greater than a predefined average latency threshold or the latency deviation is greater than a predefined latency deviation threshold; increases said at least one latency threshold of the first feedback loop if said at least one latency threshold was increased for a previous feedback time frame and the average IOPS is more than a threshold amount greater than the average IOPS for the previous feedback time frame; or leaves said at least one latency threshold unchanged.

Additionally or alternatively, responsive to a designated number of consecutive cycles in which said at least one latency threshold remains unchanged, the second feedback loop automatically increases said at least one latency threshold.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
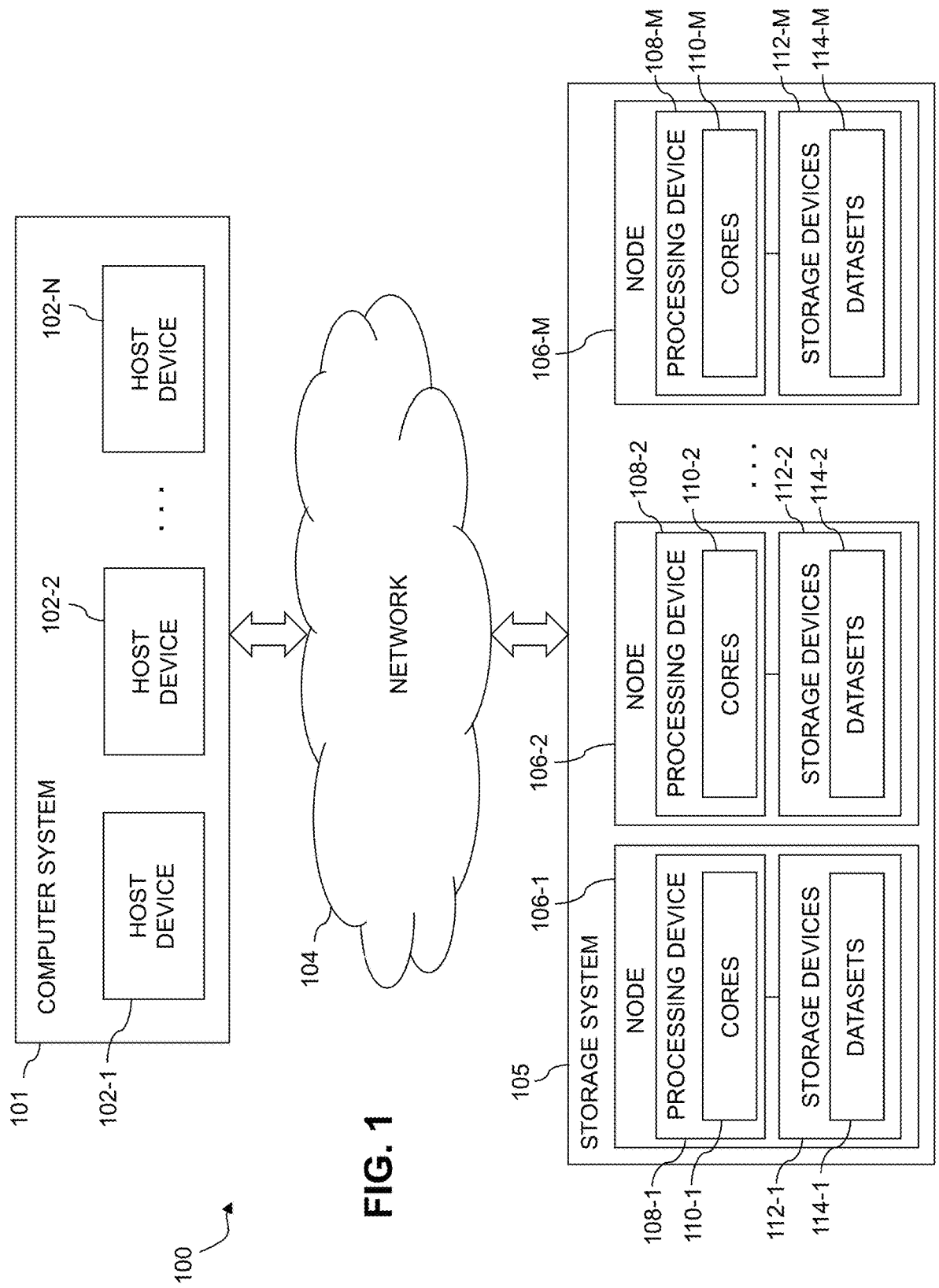
FIG. 1 is a block diagram of an information processing system comprising a storage system configured to implement adaptive flow control using multiple feedback loops in an illustrative embodiment.

FIG. 1 shows an information processing system 100 configured in accordance with an illustrative embodiment. The information processing system 100 comprises a computer system 101 that includes host devices 102-1, 102-2, . . . 102-N, collectively referred to herein as host devices 102. The host devices 102 communicate over a network 104 with a storage system 105. The storage system 105 is illustratively configured to implement one or more adaptive flow control modules using multiple feedback loops.

The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102. Such applications illustratively generate input-output (IO) operations that are processed by the storage system 105. The term "input-output" as used herein refers to at least one of input and output. For example, IO operations may comprise write requests and/or read requests directed to logical addresses of a particular logical storage volume of the storage system 105. These and other types of IO operations are also generally referred to herein as IO requests.

The host devices 102 and storage system 105 illustratively comprise respective processing devices of one or more processing platforms. For example, the host devices 102 and the storage system 105 can each comprise one or more processing devices each comprising a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, . . . 106-M, collectively referred to herein as nodes 106. The storage system 105 comprising nodes 106 is an example of what is also referred to herein as a "distributed storage system" or a "clustered storage system." For example, in some implementations of storage system 105, the nodes 106 are interconnected in a full mesh network, such that each of the nodes 106 can communicate with each of the other nodes 106, although other types of networks and different node interconnection arrangements can be used in other embodiments. At least portions of respective ones of the nodes 106 illustratively implement what is generally referred to herein as a "distributed storage controller" of the storage system 105.

In the FIG. 1 embodiment, the nodes 106-1, 106-2, . . . 106-M of the storage system 105 comprise respective processing devices 108-1, 108-2, . . . 108-M, collectively referred to herein as processing devices 108. One or more of the nodes 106 may each comprise multiple processing devices 108, although only single instances of such processing devices are shown in the figure. In some embodiments, multiple processing devices 108 of a given one of the nodes 106 may act or function as a single processing device 108.

The processing devices 108-1, 108-2, . . . 108-M comprise respective sets of cores 110-1, 110-2, . . . 110-M, collectively referred to herein as cores 110. For example, a given processing device 108 may comprise a set of two cores 110, four cores 110, eight cores 110, or any other number of cores 110 appropriate to a given implementation. The processing devices 108 therefore each illustratively comprise a multi-core processor and associated memory.

The nodes 106-1, 106-2, . . . 106-M further comprise respective sets of storage devices 112-1, 112-2, . . . 112-M, collectively referred to herein as storage devices 112. For example, a given one of the nodes 106 may comprise a single storage device 112, two storage devices 112, four storage devices 112, eight storage devices 112, sixteen storage devices 112, thirty-two storage devices 112 or any other number of storage devices 112. The storage devices 112-1, 112-2, . . . 112-M store respective datasets 114-1, 114-2, . . . 114-M, collectively referred to herein as datasets 114, which illustratively comprise logical units (LUNs) or other types of logical storage volumes, as well as snapshots and/or other arrangements of data, possibly including associated metadata, as in an embodiment in which storage devices 112 store user data pages and metadata pages of LUNs or other logical storage volumes.

The storage devices 112 of the storage system 105 illustratively comprise solid state drives (SSDs). Such SSDs are implemented using non-volatile memory (NVM) devices such as flash memory. Other types of NVM devices that can be used to implement at least a portion of the storage devices 112 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 105 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 105 illustratively comprises a scale-out all-flash content addressable storage array such as an XtremIO™ storage array from Dell EMC of Hopkinton, Mass. A wide variety of other types of storage arrays can be used in implementing the storage system 105 in other embodiments, including by way of example one or more VNX®, VMAX®, Unity™ or PowerMax™ storage arrays, each commercially available from Dell EMC.

Additional or alternative types of storage products that can be used in implementing a given storage system in illustrative embodiments include, by way of example, software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage system 105 should also be understood to include additional modules and other components typically found in conventional implementations of storage systems, although such additional modules and other components are omitted from the figure for clarity and simplicity of illustration.

In some embodiments, communications between the host devices 102 and the storage system 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein in its entirety. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

As indicated previously, the host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In the FIG. 1 embodiment, storage system 105 is implemented as a distributed or clustered storage system comprising nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that the above-described features and other features of illustrative embodiments disclosed herein are presented by way of example only and should not be construed as limiting in any way.

The particular sets of modules and other components implemented in the system 100 as illustrated in FIG. 1 are therefore presented by way of illustrative example only. In other embodiments, only subsets of these components, or additional or alternative sets of components, may be used, and such components may exhibit alternative functionality and configurations. Accordingly, different numbers, types and arrangements of system components such as host devices 102, network 104, storage system 105, nodes 106, processing devices 108, cores 110, storage devices 112, and datasets 114, or additional or alternative components, can be used in other embodiments.

Also, in some embodiments, dynamic flow control using multiple feedback loops as disclosed herein can be implemented at least in part in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

Figure 2:
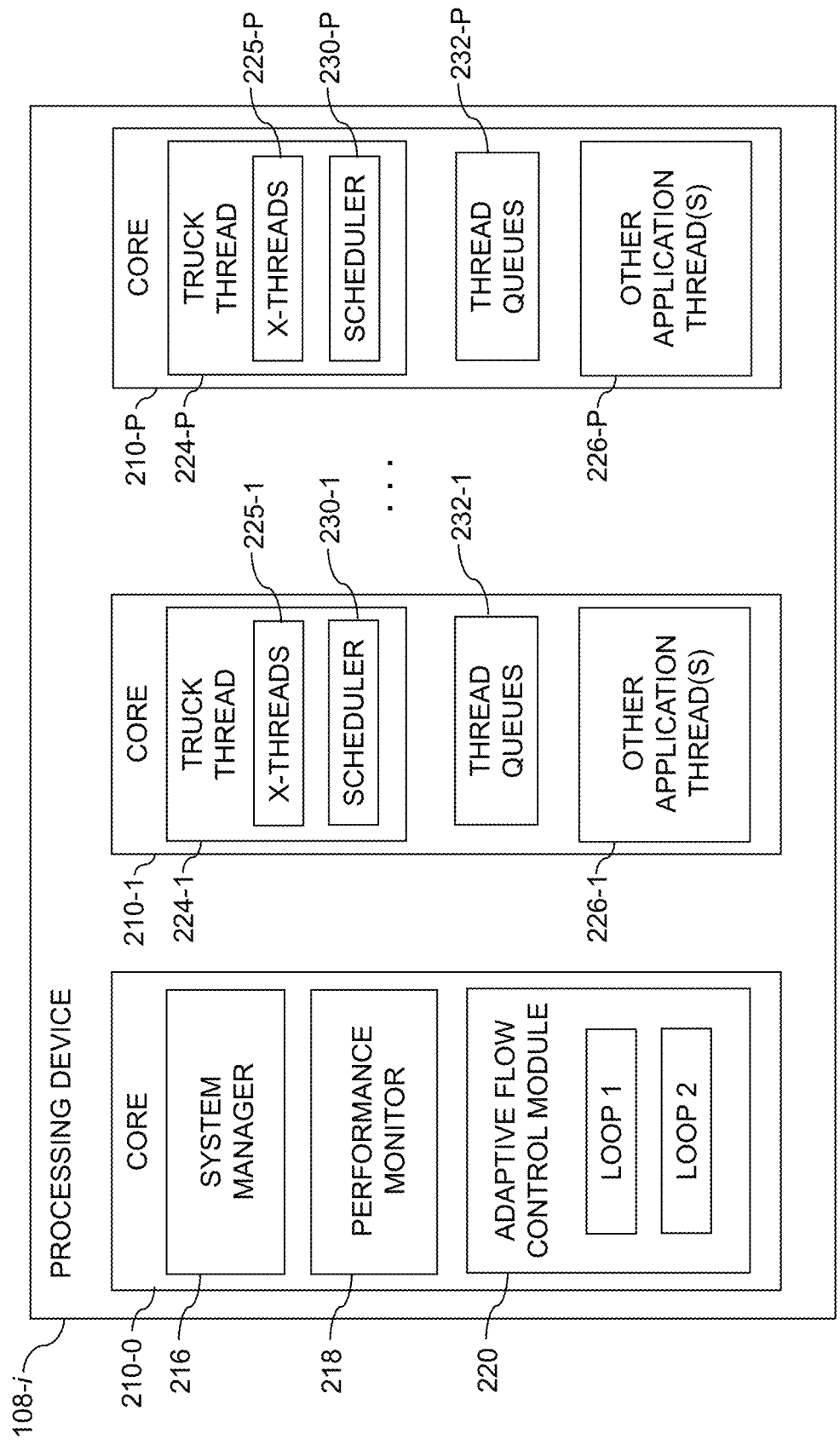
FIG. 2 is a block diagram of a processing device of the information processing system of FIG. 1 comprising a plurality of processing cores and implementing adaptive flow control using multiple feedback loops in an illustrative embodiment.

Referring now to FIG. 2, a given one of the processing devices 108, denoted as processing device 108-$i$, where i=1, 2, . . . M, is shown in more detail. The processing device 108-$i$ in this embodiment comprises a multi-core processor including processing cores 210-0, 210-1, . . . 210-P. The processing core 210-0 implements a system manager 216, a performance monitor 218 and an adaptive flow control module 220 comprising at least first and second feedback loops denoted Loop 1 and Loop 2.

The other processing cores 210-1 through 210-P execute respective truck threads 224-1 through 224-P, comprising respective sets of multiple sub-threads illustratively in the form of X-threads 225-1 through 225-P. Other types of sub-threads can be used in other embodiments. The processing cores 210-1 through 210-P also execute respective sets of one or more other application threads 226-1 through 226-P. These and other threads illustratively comprise operating system (OS) threads of their respective cores 210.

For example, in the case of a block-storage application, which handles the block-based storage functionality of the storage system 105, the block-storage application executes truck threads 224 on respective ones of the cores 210 of the processing device 108-$i$. These truck threads 224 implement the block-storage application functionality. In some embodiments, each of the truck threads 224 may be hard affined to a particular one of the processing cores 210, such that it may only execute on that particular core.

The processing cores 210 in some embodiments illustratively comprise respective distinct central processing units (CPUs). Accordingly, each of the processing devices 108 of the respective nodes 106 of storage system 105 may be viewed as comprising a multi-core CPU and an associated storage array comprising a set of storage devices 112, although numerous other arrangements are possible. The storage array or other arrangement of storage devices 112 associated with a given one of the nodes 106 may comprise, for example, a disk array enclosure (DAE), although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 224 polls a corresponding set of interfaces of the storage system 105 for tasks, events, or other data to be processed by that truck thread. For example, the set of interfaces may include an interface for indications of completions of submitted IO requests, an interface for IO requests from the user, and interfaces for other tasks, events, or other data. Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IO operations per second (IOPS) since no context switches or interrupts are required to perform the processing. In some embodiments, the functionality of the block-storage application may be described as an always-polling model.

In some embodiments, example interfaces that may be polled by a truck thread may include a front-end interface, a remote procedure call (RPC) messaging interface, a remote direct memory access (RDMA) messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface illustratively comprises an interface for receiving and replying to IO requests from users of the storage system 105 associated with respective ones of the host devices 102. For example, a given truck thread may comprise a front-end IO-provider instance that polls for new IO requests from one or more host devices 102 or other system users. In some embodiments, for example, IO requests received by the storage system 105 from the user are pooled together in a common pool that is shared between the truck threads 224 and accessed using a front-end IO-provider instance.

The RPC messaging interface illustratively comprises an interface for sending and receiving messages to and from other nodes 106 of the storage system 105. For example, a given truck thread may comprise an RPC messaging IO-provider that polls for new messages from other nodes 106 in the storage system 105. As an example, when one of the nodes 106 sends an IO request to another one of the nodes 106, the sender node selects the specific destination truck thread, that is, the truck thread that will receive and handle the request.

The RDMA messaging interface illustratively comprises an interface for RDMA transfer of buffers between nodes 106. For example, a given truck thread may comprise an RDMA messaging IO-provider that polls for the completion of RDMA transfers between nodes 106.

The back-end interface illustratively comprises an interface for accessing the storage devices 112 in order to write data to and read data from the storage devices 112. For example, a given truck thread may comprise a back-end IO-provider that polls for the completion of write and read requests initiated by the truck thread to one or more of the storage devices 112 of processing device 108-$i$.

In some cases, the storage system 105 may also implement one or more other applications aside from the block-storage application. For example, a file-storage application that provides a file interface to a user of the information processing system 100 may also be implemented by the storage system 105, for example, by executing corresponding threads 226 on one or more of the cores 210. In some cases, the block-storage application and the file-storage application, or any other application, may be implemented by the storage system 105 simultaneously, each with a different load that can dynamically change over time.

Since these applications are attempting to utilize the same set of processing cores 210 simultaneously, management of the available processing resources of these cores 210 between the applications can be challenging. For example, since the block-storage application is implemented by executing truck threads 224 on each of the processing cores 210 of each of the nodes 106, and these truck threads 224 can utilize the full capacity of those processing cores 210, little to no processing resources of the storage system 105 may be available for use by threads 226 of another application.

In some embodiments, if only the file-storage application is actively in use, such that no tasks, events, or other data are present for the truck threads 224 to process, the associated file threads may only be able to utilize a portion of the processing resources of a core, such as 50% or another percentage, where the remaining portion, such as the other 50% or another percentage, will be used by the truck threads 224 just for polling interfaces. In cases where the block-storage application is actively performing operations, the truck threads 224 will utilize a substantial portion of the processing resources of the cores, such as 90%, 95%, or even 100%, to both poll the interfaces and process any tasks, events, or other data found on those interfaces during the polling, which leaves little to no processing resources available on those cores for use by other applications such as a file-storage application.

Examples of storage systems that allow the full processing resources of a core to be available for use by other applications, even when a truck thread of a block-storage application is utilizing that core to support its functionality, are disclosed in U.S. patent application Ser. No. 16/251,779, filed Jan. 18, 2019 and entitled "Multi-Core Processor in Storage System Executing Dedicated Polling Thread for Increased Core Availability," which is incorporated by reference herein in its entirety. This patent application more particularly discloses a storage system that in one or more illustrative embodiments is able to dynamically adapt to the user operation patterns of multiple simultaneously implemented applications where, for example, one of the applications executes an always-polling model of functionality that consumes significant processing resources using the above-described truck threads.

Additionally, techniques are disclosed in the above-cited U.S. patent application Ser. No. 16/251,779 for creating an event-driven storage system out of a storage system implementing the above-described always-polling model, through the use of a dedicated peek-poller thread. The dedicated peek-poller thread serves as a mechanism to allow for the sharing of the full resources of the other cores in a processing device between the two or more applications in a manner that dynamically matches the user operation pattern. For example, the dedicated peek-poller thread is executed on a core of the processing device and partially replaces the polling functionality of each of the truck threads executing on the other cores in the processing device, thereby freeing up the processing resources of those other cores that would otherwise be used by the truck threads for polling for use by other applications during times when the block-storage application is experiencing reduced activity.

However, a situation may arise where, for example, the block-storage application is utilizing the full resources of the processing cores 210 such that having a dedicated peek-poller thread executing on one of the cores 210 reduces the total amount of processing resources available to the block-storage application. For example, if there are ten cores available on the processing device 108-$i$, and one of the cores is executing a dedicated peek-poller thread, only nine of the cores or 90% of the processing resources of the processing device are available for use by the block-storage application.

U.S. patent application Ser. No. 16/251,868, filed Jan. 18, 2019 and entitled "Multi-Core Processor in Storage System Executing Dynamic Thread for Increased Core Availability," also incorporated by reference herein in its entirety, discloses in illustrative embodiments dynamic truck threads that may be executed on the cores of a processing device. The function of each of the dynamic truck threads is modifiable between multiple operating modes such that the full processing resources of all of the cores of a processing device are available for use by a block-storage application during periods of time when the block-storage application is exhibiting high levels of core utilization while the processing resources of the cores are also available for other applications during periods of time when the block-storage application is exhibiting moderate to low levels of core utilization.

For example, in such embodiments, the function of a given dynamic truck thread is dynamically modifiable between an operating mode where the given dynamic truck thread performs the above-described truck thread functionality and an operating mode where the given dynamic truck thread performs at least some of the above-described peek-poller thread functionality. In some embodiments, the functionality of each of the dynamic truck threads may also be modified to an operating mode where all functions of the dynamic truck threads are disabled on the cores 210 of the processing device 108-$i$ such that the processing resources of the cores 210 are fully available for use by other applications, such as a file-storage application.

Illustrative embodiments disclosed herein can utilize one or more of the techniques disclosed in the above-cited U.S. patent application Ser. Nos. 16/251,779 and 16/251,868. For example, one or more of the truck threads 224 of FIG. 2 may be implemented as respective dynamic truck threads. However, it is to be appreciated that utilization of such techniques is not required in illustrative embodiments disclosed herein.

The processing cores 210 of the FIG. 2 embodiment can therefore execute threads of multiple applications, including truck threads 224 and other application threads 226. For example, in some embodiments, a block-storage application is implemented by executing truck threads 224 on respective ones of the cores 210, with each of the truck threads 224 implementing a corresponding portion of the block-storage application. As described above, by executing truck threads 224 on respective cores 210, a significant portion of the processing resources of each of the cores 210 is utilized for polling interfaces associated with its corresponding truck thread, and processing associated tasks, events or other data found on those interfaces, leaving little to no processing resources available on that core for executing the threads of other applications. Some embodiments address this issue through the use of dynamic truck threads executing on one or more of the processing cores 210.

Performance monitoring techniques are illustratively used in storage system 105 to monitor the performance of core threads, such as the truck threads 224 executing on respective ones of the processing cores 210.

In some embodiments, the processing device 108-$i$ of the storage system 105 is configured to implement performance monitoring functionality for core threads of the storage system 105, such as the truck threads 224 that include respective schedulers 230. One or more of the schedulers 230 can each include both an internal scheduler and an external scheduler, as disclosed in U.S. patent application Ser. No. 16/747,138, filed Jan. 20, 2020 and entitled "Performance Monitoring for Storage System with Core Thread Comprising Internal and External Schedulers," which is incorporated by reference herein in its entirety.

The performance monitor 218 is configured to monitor performance of threads executing on the processing cores 210, such as truck threads 224 and other application threads 226. Such performance monitoring in illustrative embodiments involves collecting performance measurements from respective ones of the core threads. Such performance measurements made by the performance monitor 218 are illustratively utilized by the adaptive flow control module 220 as well the system manager 216.

For example, in the FIG. 2 embodiment, the truck thread 224-1 is assumed to be part of a block-storage application executing on the processing core 210-1. The truck thread 224-1 comprises a scheduler 230-1, which as noted above may include an internal scheduler, illustratively configured to control switching between particular ones of the X-threads 225-1 of the truck thread 224-1, and an external scheduler, illustratively configured to control release of the processing core 210-1 by the truck thread 224-1 for use by at least one of the other application threads 226-1 of a second application different than the block-storage application. In some embodiments, the second application comprises a file-storage application, although references herein to block-storage applications and file-storage applications are considered non-limiting examples.

The performance monitor 218 illustratively gathers such performance measurements from the truck thread 224-1 and from other ones of the truck threads 224 executing on respective other ones of the cores 210, and provides such measurements to the system manager 216 for use in controlling configuration of the processing device 108-$i$ and its processing cores 210 and their associated threads 224 and 226. As mentioned previously, the truck thread 224-1 when executing on the processing core 210-1 is illustratively configured to utilize substantially all available processing resources of the processing core 210-1, such as 90% or more of the available processing resources of that core. Other embodiments can combine at least portions of system manager 216 and performance monitor 218 into a single component implemented on one or more processing cores 210 of at least one of the processing devices 108. The adaptive flow control module 220 can similarly be combined with one or both of the system manager 216 and performance monitor 218 in other embodiments.

As indicated above, the truck threads 224 run respective sets of X-threads 225. The X-threads 225 illustratively comprise respective lightweight threads that are scheduled by the schedulers 230 of the respective truck threads 224. For example, there may be thousands of X-threads 225 associated with each of the truck threads 224, with each of the X-threads 225 representing a specific flow or processing job (e.g., synchronous read/write, destage, RAID rebuild, defragmentation, and numerous others). The X-threads 225 in some embodiments are non-preemptive (e.g., cooperative), which means that one of the X-threads of a particular truck thread voluntarily gives up execution in order to allow another one of the X-threads of that truck thread to be scheduled. If an X-thread is doing a lengthy computational task (e.g., a task taking tens of microseconds), it should contain explicit yield and/or suspension calls, or implicit calls by waiting on synchronization objects.

It is assumed in some embodiments herein that each X-thread can be in one of multiple designated states at a particular point in time, including, for example, a running state, a ready state and a suspended state. In the running state, the X-thread is currently running. In the suspended state, the X-thread is waiting on a synchronization object (e.g., a semaphore, a timer, a lock, a barrier, a memory pool, a thread pool, etc.) In the ready state, the X-thread is ready to run, but waiting for the processing core (e.g., another X-thread is currently running).

The X-threads 225-1 are examples of what are more generally referred to herein as "sub-threads" of their corresponding truck thread 224-1. Other types of sub-threads having different arrangements of possible states can be used in other embodiments.

The X-threads 225-1 in some embodiments therefore comprise respective non-preemptive threads and the truck thread 224-1 is configured such that no X-thread in the running state is suspended to allow release of the processing core 210-1 by the truck thread 224-1 for use by the other application thread 226-1. Multiple suspensions of the truck thread 224-1 to allow the other application thread 226-1 to execute may therefore each occur in conjunction with a switch between X-threads 225-1 of the truck thread 224-1. As mentioned previously, the scheduling of the X-threads 225-1 is illustratively performed under the control of an internal scheduler in scheduler 230-1 of the truck thread 224-1.

In some embodiments, an external scheduler in scheduler 230 of the truck thread 224-1 comprises a processing core release component and a waker component. The processing core release component is configured to determine, in conjunction with each switch between X-threads 225-1 of the truck thread 224-1, whether or not the truck thread 224-1 will suspend itself so as to release the processing core 210-1 for use by at least another application thread 226-1 of the file-storage application. The processing core release component in some embodiments may be referred to as a CPU release component, as the processing cores such as cores 210 may comprise respective distinct CPUs of the processing device 108-1.

In some embodiments, the processing core release component of the truck thread 224-1 more particularly operates as follows. On every X-thread switch, a determination is made as to whether or not the truck thread 224-1 will give up execution, to allow other applications (e.g., a file-storage application) to run. When a truck thread suspends itself, it will resume execution when no other application is ready to run, or it will be rescheduled to run after a certain time by the waker component, whichever happens first.

The waker component is configured to determine, in conjunction with each switch between X-threads 225-1 of the truck thread 224-1, whether or not there is at least one additional thread of the block-storage application to be returned from suspension prior to release of the processing core 210-1 by the truck thread 224-1.

The waker component in some embodiments more particularly operates as follows. On every X-thread switch, and before the decision is made whether to give up the processing core, the waker component checks if there are currently one or more other truck threads of the block-storage application that are suspended and need to be awakened, and if so it wakes up the one or more other truck threads.

The processing core release component therefore illustratively operates in conjunction with the waker component to suspend the truck thread 224-1 and to return the truck thread 224-1 from suspension. Other arrangements of additional or alternative components can be included in the external scheduler of scheduler 230-1 in other embodiments.

In some embodiments, the threads of the one or more applications executing on at least one of the processing cores 210 comprise different X-threads 225 of one or more truck threads 224 of one or more applications executing on a particular one of the processing cores 210, such as processing core 210-1. For example, the one or more applications can comprise a block-storage application of the storage system 105 and the truck threads can comprise truck thread 224-1 that when executing on the processing core 210-1 is configured to utilize substantially all available processing resources of that processing core.

As indicated previously, each of the X-threads 225-1 of the truck thread 224-1 is illustratively in one of multiple designated states at a particular point in time, including a running state, a ready state and a suspended state. Other types and arrangements of states can be used in other embodiments.

Different ones of the X-threads 225-1 that are in the ready state are illustratively enqueued in one or more of the thread queues 232-1 in order to wait for access to a CPU resource of the processing core 210-1. The thread queues that are used to hold X-threads 225-1 that are in the ready state are also referred to herein as "ready queues." A ready queue is considered an example of a "thread queue" as that term is broadly used herein.

Other ones of the X-threads 225-1 that are in the suspended state are illustratively enqueued in respective different ones of the thread queues 232-1 in order to wait for access to respective corresponding synchronization objects associated with resources of the processing core 210-1. A given such synchronization object can include, for example, a semaphore, a timer, a lock, a barrier, a memory pool and a thread pool, or various combinations thereof.

Accordingly, when in the ready state, a given one of the X-threads 225-1 is illustratively queued in a ready queue associated with the scheduler 230-1. Such ready queues are assumed to be part of the thread queues 232-1 of the processing core 210-1. When in the suspended state, the X-thread is illustratively queued in one of the thread queues 232-1, other than one of the ready queues.

Although shown as separate from the scheduler 230-1 in this embodiment, at least a portion of the thread queues 232-1 may be implemented as part of the scheduler 230-1 in other embodiments. For example, the ready queues may in some embodiments be implemented as part of the scheduler 230-1. Also, the scheduler 230-1, although illustratively shown as part of the truck thread 224-1 in the present embodiment, could instead be implemented as a separate component of the processing core 210-1 in other embodiments.

The storage system 105 illustratively receives an IO operation for processing, from one of the host devices 102, and performs what is referred to herein as "end-to-end" processing of the IO operation using adaptive flow control.

As indicated elsewhere herein, the processing of the IO operation is illustratively distributed across a plurality of distinct storage nodes 106 of the storage system 105, with each of the storage nodes 106 including a different one of the processing devices 108 and a corresponding set of processing cores 210 of the storage system 105. The processing of a given IO operation in the storage system 105 can involve generation of different threads on different ones of the storage nodes 106.

The processing of the IO operation in the storage system 105 can be a very complex process that goes through many steps in multiple ones of storage nodes 106, with each such storage node running many different jobs involving different flows and components, with potentially large numbers of cross-dependencies. The disclosed techniques advantageously facilitate the provision of adaptive flow control for IO operations in these and numerous other storage system contexts, as will be described in more detail below.

The processing of a given IO operation is illustratively comprised of intervals of X-thread processing time and waiting time. The latter illustratively includes time spent in thread queues waiting for the above-noted synchronization objects, and/or RPC replies, disk acknowledgements, resource allocations, and so on.

In some embodiments, at least a portion of the thread queues 232-1 may comprise prioritized thread queues, illustratively used for all or substantially all synchronization objects for which threads encounter significant waiting times, as disclosed in U.S. patent application Ser. No. 16/915,380, filed Jun. 29, 2020 and entitled "End-to-End Quality of Service Mechanism for Storage System Using Prioritized Thread Queues," which is incorporated by reference herein in its entirety. An example implementation of a prioritized thread queue ("PrioThQ") provides flexible and distinct dequeuing policies for X-threads of a given IO operation based on assigned class of service (CoS) tags. For example, each of a plurality of different synchronization objects may have respective different PrioThQs associated therewith. The PrioThQ may be a generalization of a basic ThQ class, where ThQ denotes a single thread queue, illustratively a simple first-in first-out (FIFO) queue. The PrioThQ provides a generic basis for different prioritized synchronization objects, such as semaphores, timers, locks, barriers, memory pools, thread pools etc. The PrioThQ may be viewed as aggregation of several simple ThQs with a smart dequeuing policy for dequeuing threads from those multiple ThQs. It is to be appreciated that use of prioritized thread queues is not required, and may be eliminated in other embodiments. A wide variety of additional or alternative types of thread queues can be used as part of the thread queues 232-1 of the processing core 210-1.

Performance monitoring functionality implemented in storage system 105 in some embodiments includes aspects of performance monitoring as disclosed in U.S. Pat. No. 10,152,232, entitled "Low-Impact Application-Level Performance Monitoring with Minimal and Automatically Upgradable Instrumentation in a Storage System," which is incorporated by reference herein in its entirety.

For example, U.S. Pat. No. 10,152,232 describes techniques for monitoring of storage system processing time dynamics at a flow level, in order to generate performance measurements that can be used for various purposes such as for the investigation and debugging of issues as well as for performance analysis of the storage system.

However, other performance monitoring techniques can be implemented in other embodiments, and illustrative embodiments should therefore not be viewed as being limited to use with any particular performance monitoring techniques, such as those disclosed in U.S. Pat. No. 10,152,232.

The manner in which a processing device 108-1 provides adaptive flow control using multiple feedback loops will now be described in more detail. Again, each of the other processing devices 108 is assumed to be configured in a manner similar to that described herein with regard to processing device 108-1. It is to be appreciated that in some embodiments, different end-to-end latency measurements are generated for each of a plurality of IO operations processed by the storage system 105. The term "end-to-end" in this context illustratively refers to processing of a given IO operation from receipt of that IO operation in the storage system 105 from a given one of the host devices 102 to completion of the processing of that IO operation in the storage system 105. Other types and arrangements of latency measurements can be provided in other embodiments.

It is important for a storage system such as storage system 105 to include a flow control mechanism to prevent overloading of the storage nodes 106 of the storage system. In illustrative embodiments, such functionality is provided using the adaptive flow control module 220, and possibly similar modules or other associated logic implemented on one or more other ones of the processing devices 108. The use of a flow control mechanism is particularly important in distributed storage systems with strict latency limits or other performance guarantees, such as a guaranteed end-to-end latency at or below a specified maximum latency for all IO operations processed by the storage system.

It is generally not desirable for such a flow control mechanism to be based on constant preconfigured IOPS thresholds, since the storage system load level strongly depends on the input pattern of IO operations. For example, a particular 10 pattern with "big reads" mixed with "small writes" or some other specific combination of IO operations may load the storage system substantially more than some other IO pattern, even if the particular 10 pattern provides the same overall processing bandwidth as the other IO pattern.

U.S. Pat. No. 10,048,874, entitled "Flow Control with a Dynamic Window in a Storage System with Latency Guarantees" and incorporated by reference herein in its entirety, discloses in one or more illustrative embodiments a flow control mechanism in which a window size is adjusted depending on actual average end-to-end latency of IO operations. For example, in some embodiments disclosed therein, when the latency exceeds a first "high latency" threshold, the dynamic flow control window size is decreased. Similarly, when the average end-to-end latency is less than a second "low latency" threshold, the dynamic flow control window size is increased.

Figure 4:
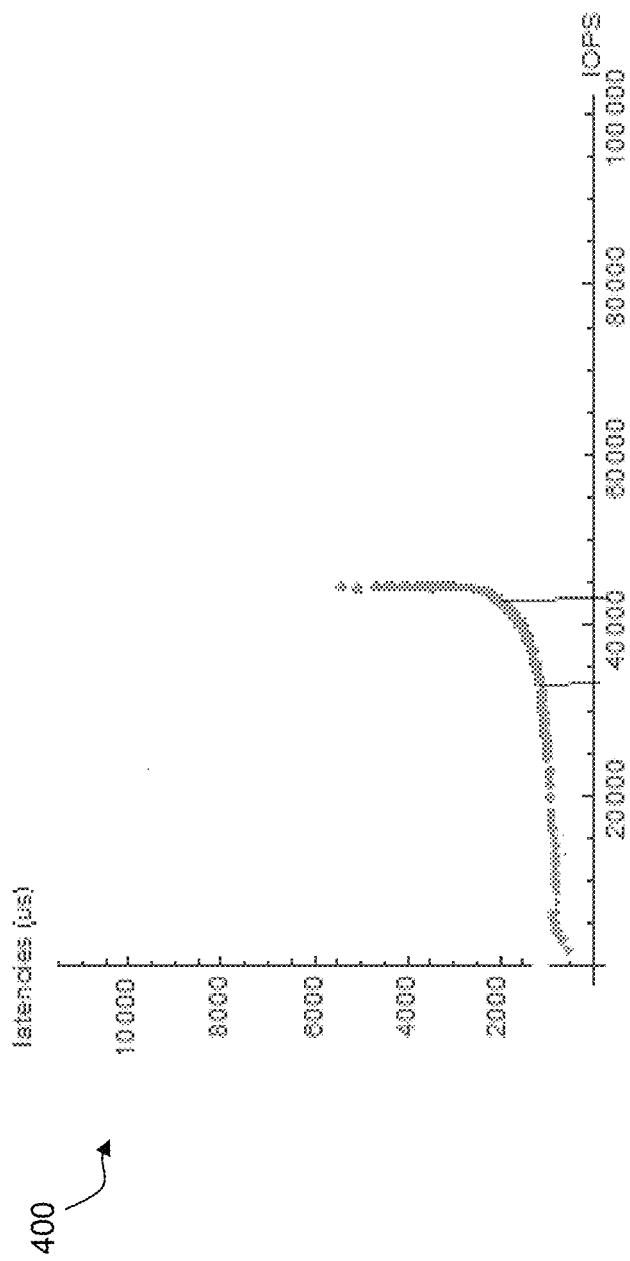
FIG. 4 shows an example plot of average latency as a function of IOPS within a given storage system in an illustrative embodiment.

Such a mechanism generally provides good adaptiveness to short-term load fluctuations and hiccups, illustratively on the order of seconds, minutes or hours, thereby preventing the storage system from entering into an unsafe or unpredictable zone "after the shoulder" of a curve of latency as a function of IOPS, such as an example latency-IOPS curve 400 shown in FIG. 4. For latency values in or near this zone, the latency can grow rapidly or in an uncontrolled manner with further increases in IOPS, as illustrated in FIG. 4.

In some embodiments, a flow control mechanism is configured to limit the number of IO requests or chunks of IO requests that can be concurrently processed in the storage system 105. The flow control mechanism illustratively includes a flow control window that defines a maximum total data size that is available for the concurrent processing. For example, the flow control window may define a maximum number of logical blocks of a particular unit size that are allowed to be concurrently processed by the storage system. The logical blocks may be specified in terms of a unit size of 512 bytes, although a wide variety of other unit sizes can be used in defining a flow control window, such as 4 KB, 8 KB, 16 KB and so on, as appropriate to a given storage system implementation.

In some embodiments, the storage system 105 is configured to split large IO requests into smaller chunks for processing. For example, if the size of a large IO request is greater than a specified maximum IO size of the storage system, the large IO request is split into separate chunks of each having no more than the maximum IO size. Each chunk may be processed by the storage system 105 using a different thread with each chunk passing through the flow control mechanism independently.

In a typical case, the flow control window size is much greater than the maximum IO size and many chunks may be processed concurrently. This concurrent processing may occur even where multiple chunks have a size equal to the maximum IO size. For example, the flow control window size during typical operations may be four times, eight times, or any other amount larger than the maximum IO size.

In so-called "edge cases," such as situations where a significant or high percentage of the storage system resources are utilized by critical background tasks or otherwise not available for servicing IO requests, the average IO latency of the storage system may greatly increase. As an example, a double SSD failure in a RAID array may be an edge case that causes the IO latency of the storage system to greatly increase as the processing resources of the storage system are used to rebuild the RAID array or perform other related actions.

U.S. Pat. No. 10,606,519, entitled "Edge Case Handling in System with Dynamic Flow Control" and incorporated by reference herein in its entirety, discloses illustrative embodiments for more efficient processing of IO requests and chunks during periods of high IO latency in the storage system when the flow control window size is dynamically reduced below the maximum IO size of the storage system. For example, such embodiments allow IO requests and chunks having a size greater than the flow control window size to pass through the flow control mechanism in a serialized manner.

Despite the considerable advantages of the approaches disclosed in the above-cited U.S. Pat. Nos. 10,048,874 and 10,606,519, a need remains for further improvements in flow control mechanisms, particularly in distributed storage systems that are subject to strict end-to-end latency constraints.

Illustrative embodiments herein provide an improved flow control mechanism that is not only adaptive to short-term factors, but is also adaptive to a wide variety of different long-term factors, including by way of example:

1. Permanent change of load pattern (e.g., storage system was first used with a database application, and then reconfigured for use with a virtual desktop manager (VDM) application).

2. Accumulated changes in internal system structures over time, such as filling of RAID stripes, fragmenting of resources, increasing depth of search trees, etc.

3. Deletion of large storage volumes.

4. System logic updates (e.g., software fixes, new features, etc., not necessarily dedicated for performance optimization).

These and other long-term factors can significantly change the behavior of the storage system. For example, some long-term factors can cause an upward shift in the curve of latency as a function of IOPS, such that the above-noted unsafe or unpredictable "after the shoulder" zone may now be reached at a higher IOPS value than it was previously. Under such conditions, the flow control mechanism may reduce the window size earlier than it should for certain IO patterns, which can prevent the storage system from achieving its maximal bandwidth in terms of IOPS. Similarly, other long-term factors can cause a downward shift in the curve of latency as a function of IOPS, such that the above-noted unsafe or unpredictable "after the shoulder" zone may now be reached at a lower IOPS value than it was previously. Under such conditions, the dynamic flow control may be unable to sufficiently reduce the window size before the IOPS reaches the problematic zone.

Illustrative embodiments disclosed herein address these and other drawbacks of conventional practice by providing adaptive flow control using multiple feedback loops. For example, in some embodiments, a first feedback loop is generally configured to provide dynamic flow control window size adjustments based on short-term load fluctuations and hiccups, illustratively on the order of seconds, minutes or hours, while a second feedback loop is configured to provide dynamic flow control window size adjustments based on long-term factors such as those identified above.

The first feedback loop illustratively comprises a primary feedback loop configured to provide adaptive regulation of window size based on end-to-end IO latency, while the second feedback loop illustratively comprises an additional external loop that is configured to optimize or otherwise adjust one or more of the thresholds of the primary feedback loop for long-term factors. Such an arrangement advantageously ensures that the storage system is adaptive to both short-term fluctuations and long-term permanent changes. The storage system can therefore achieve maximal IOPS throughput while also limiting latency to desirable levels.

In some embodiments, the second feedback loop is based on average IOPS on relatively longer intervals such as days, weeks or months, as compared to the first feedback loop which is based on relatively shorter intervals such as seconds, minutes or hours.

As indicated previously, the adaptive flow control module 220 includes first and second feedback loops denoted as Loop 1 and Loop 2, respectively.

In this embodiment, the first feedback loop adjusts a window size defining an amount of concurrent processing of the IO operations in the storage system 105 responsive to a measured latency for processing of one or more of the IO operations. The second feedback loop adjusts at least one latency threshold used to control adjustment of the window size in the first feedback loop.

Although two feedback loops are used in this embodiment, it is possible in other embodiments to implement adaptive flow control using more than two feedback loops. For example, different instances of the second feedback loop can be implemented for different length measurement intervals or cycles, so as to provide different types of responsiveness to conditions that vary over different long-term time frames.

Also, the term "feedback loop" as used herein is intended to be broadly construed, so as to encompass, for example, various arrangements in which measurements of latency, latency deviation, IOPS or other IO processing performance parameters of the storage system 105 are utilized to adjust one or more latency thresholds or other aspects of a control mechanism that controls designated functionality of the storage system 105, such as flow control via a variable window size.

The first feedback loop is illustratively configured to decrease the window size responsive to the measured latency being greater than an upper latency threshold and to increase the window size responsive to the measured latency being less than a lower latency threshold, although other configurations of the first feedback loop can be used.

In some embodiments, the measured latency for processing of one or more of the IO operations comprises an average end-to-end latency measured across multiple ones of the IO operations. FIG. 4 shows an example plot of average end-to-end latency as a function of IOPS in one possible implementation of storage system 105.

The window size in illustrative embodiments defines a maximum permitted amount of concurrent processing of the IO operations in the storage system 105 in terms of a number of data units of a particular size.

The first feedback loop in some embodiments is configured to respond to relatively short-term fluctuations in processing performance of the storage system 105 and the second feedback loop is configured to respond to relatively long-term fluctuations in processing performance of the storage system 105.

For example, the first feedback loop illustratively comprises a primary feedback loop of the adaptive flow control and the second feedback loop comprises an external feedback loop of the adaptive flow control and is configured to adjust the at least one latency threshold of the primary feedback loop.

In some embodiments, the second feedback loop adjusts the at least one latency threshold of the first feedback loop based at least in part on a designated throughput measure, such as, for example, average IOPS measured over a relatively long-term interval as compared to a relatively short-term interval over which the measured latency utilized in the first feedback loop is determined.

The second feedback loop in some embodiments operates over a plurality of cycles each corresponding to a designated feedback time frame for which the second feedback loop determines whether or not the at least one latency threshold of the first feedback loop is to be adjusted. In some arrangements of this type, for each of the designated feedback time frames, the second feedback loop illustratively determines a plurality of measured parameters including, for example, average latency, latency deviation and average IOPS for the feedback time frame. These and other measurements referred to herein in some embodiments are illustratively made at least in part by the performance monitor 218.

In some embodiments, for a given one of the feedback time frames, the second feedback loop either decreases the at least one latency threshold of the first feedback loop if the average latency is greater than a predefined average latency threshold or the latency deviation is greater than a predefined latency deviation threshold; increases the at least one latency threshold of the first feedback loop if the at least one latency threshold was increased for a previous feedback time frame and the average IOPS is more than a threshold amount greater than the average IOPS for the previous feedback time frame; or leaves the at least one latency threshold unchanged.

Additionally or alternatively, responsive to a designated number of consecutive cycles in which the at least one latency threshold remains unchanged, the second feedback loop automatically increases the at least one latency threshold.

References above and elsewhere herein to "the at least one latency threshold" illustratively refer to an upper latency threshold, a lower latency threshold, or both upper and lower latency thresholds. Therefore, the second feedback loop can adjust one or both of these thresholds, depending upon the implementation. Such thresholds are also referred to herein as respective high latency and low latency thresholds. Other types and arrangements of one or more thresholds can be used in other embodiments.

The operation of the information processing system 100 will now be described in further detail with reference to the flow diagram of the illustrative embodiment of FIG. 3. The process as shown in FIG. 3 includes steps 300 through 304, and is suitable for use in system 100 but is more generally applicable to other types of information processing systems in which a storage system is configured to implement dynamic flow control using multiple feedback loops of the type disclosed herein.

Figure 3:
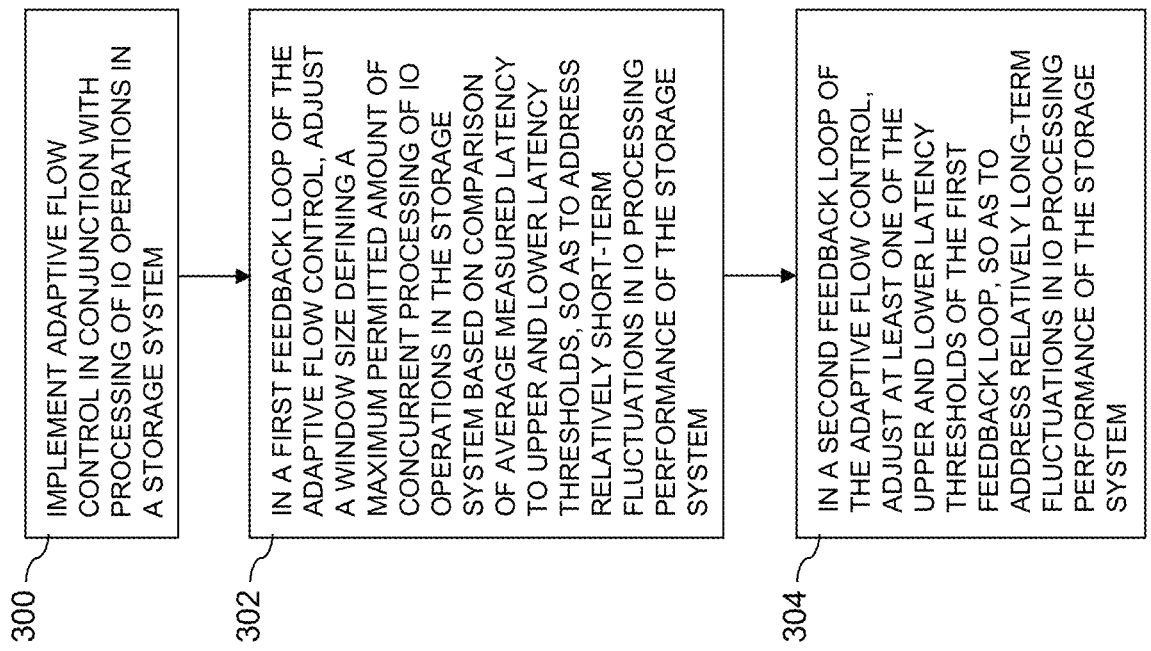
FIG. 3 is a flow diagram of an example process providing adaptive flow control using multiple feedback loops in an illustrative embodiment.

The steps of FIG. 3 are illustratively performed at least in part under the control of one or more processing devices 108 of one or more nodes 106 in storage system 105 of system 100. For example, in some embodiments, the steps of FIG. 3 may be performed under the control of system manager 216 executing on processing device 108-$i$ of a corresponding one of the nodes 106 of the storage system 105, utilizing its associated performance monitor 218 and adaptive flow control module 220. Some or all of the steps may be performed asynchronously relative to one another rather than serially as illustrated in the figures. Also, multiple instances of the process can be performed at least in part in parallel to one another for respective different ones of the processing devices 108. For example, the other processing devices 108 are illustratively configured to execute similar processes for adaptive flow control using multiple feedback loops in one or more of their processing cores 210.

In step 300, adaptive flow control is implemented in conjunction with processing of IO operations in storage system 105. The storage system 105 illustratively includes one or more instances of adaptive flow control module 220, comprising first and second feedback loops denoted as Loop 1 and Loop 2, respectively, for implementing the adaptive flow control in the manner disclosed herein.

In step 302, in the first feedback loop of the adaptive flow control, a window size defining a maximum permitted amount of concurrent processing of IO operations in the storage system 105 is adjusted based on comparison of average measured latency to upper and lower latency thresholds, so as to address relatively short-term fluctuations in IO processing performance of the storage system 105.

In step 304, in the second feedback loop of the adaptive flow control, at least one of the upper and lower latency thresholds of the first feedback loop is adjusted, so as to address relatively long-term fluctuations in IO processing performance of the storage system 105.

Performance measurements made by performance monitor 218 are illustratively utilized by the first and second feedback loops. For example, the average measured latency referred to in the context of step 302 above is illustratively determined at least in part based on performance measurements made by performance monitor 218.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller comprising at least a portion of each of one or more of the processing devices 108 of storage system 105 and configured to control performance of one or more steps of the process of FIG. 3 in system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices of such processing platforms. For example, in a distributed implementation, respective distributed modules of such a storage system 105 can be implemented in respective containers running on respective ones of the processing devices of a processing platform.

FIG. 4 shows an example plot of average latency as a function of IOPS within a given storage system in an illustrative embodiment. The average latency in this example is an average end-to-end latency in microseconds (us) computed over multiple IO operations. As indicated elsewhere herein, it is apparent from the figure that there is an unsafe or unpredictable zone "after the shoulder" of the latency-IOPS curve 400. For latency values in or near this zone, the latency can grow rapidly or in an uncontrolled manner with further increases in IOPS. The adaptive flow control using multiple feedback loops as disclosed herein utilizes a second feedback loop with long-term responsiveness to adjust one or more upper and lower latency thresholds of a first feedback loop with short-term responsiveness, in a manner that allows higher levels of IOPS to be achieved by the storage system while also ensuring that latency guarantees can be met within the storage system.

It is to be appreciated that the particular features of FIG. 4, and those of other illustrative embodiments, are presented by way of example only, and should not be construed as limiting in any way.

In some embodiments, the following example algorithm is implemented by the adaptive flow control module 220 to provide adaptive flow control using first and second feedback loops as disclosed herein:

1. Set initial high latency and low latency thresholds for the first feedback loop to reasonable default values.

2. Define a feedback time frame (e.g., one week) for the second feedback loop, as a time interval within which the second feedback loop will check whether or not the current latency thresholds of the first feedback loop are optimal, and if not will determine whether one or both of those thresholds should be altered. The feedback time frames are associated with respective cycles of the second feedback loop.

3. During each feedback time frame, measure parameters including average latency, latency deviation and average IOPS for the feedback time frame. In measuring the average IOPS, the calculation may be limited to specified peak hours, when the latency and IOPS are near the shoulder of the above-noted latency-IOPS curve. Such an arrangement can avoid measurement noise that might otherwise result from those intervals when the system is not fully loaded and the adaptive flow control is not actually enforced.

4. At the end of each feedback time frame, implement one of the following based on the measured parameters:

(a) Decrease the high and low latency thresholds of the first feedback loop if the average latency is greater than a predefined average latency threshold (e.g., indicative of extremely high latency) OR the latency deviation is greater than a predefined latency deviation threshold. Both of these conditions tend to indicate that the storage system is operating in or near the shoulder area of the latency-IOPS curve. In other embodiments, only a single latency threshold of the first feedback loop is decreased, such as the high latency threshold.

(b) Increase the high and low latency thresholds of the first feedback loop if those high and low latency thresholds were increased for the previous feedback time frame AND the average IOPS in the current feedback time frame is more than a threshold amount greater than the average IOPS in the previous feedback time frame. These conditions taken together tend to indicate that the latency thresholds are too restrictive, and that the storage system is operating far below the shoulder area of the latency-IOPS curve. In other embodiments, only a single latency threshold of the first feedback loop is increased, such as the high latency threshold.

(c) Leave the high and low latency thresholds of the first feedback loop unchanged. In this case, the next cycle of the second feedback loop is considered "steady."

5. After one or more consecutive steady cycles of the second feedback loop, the latency thresholds of the first feedback loop are increased by one step. Thus, the next cycle of the second feedback loop is considered non-steady in that is performed with increased latency thresholds. The particular number of consecutive steady cycles that triggers an increase in the latency thresholds of the first feedback loop, like other thresholds of the second feedback loop, may be tunable configuration parameters of the storage system.

6. The above-noted adjustments to the latency thresholds of the first feedback loop are performed in small predefined steps (e.g., no more than a single step of increase or decrease of a given latency threshold per feedback time frame or cycle of the second feedback loop). This is to prevent jitter.

7. If average latency of the storage system reaches some predefined critical level, the high and low thresholds of the first feedback loop may be decreased immediately without waiting for completion of the current cycle of the second feedback loop. In this case, the current cycle of the second feedback loop is interrupted and the new cycle of the second feedback loop begins immediately.

The steps of this example algorithm can be varied in other embodiments. For example, the ordering of the steps need not be sequential as illustrated above, and instead one or more of the steps can be performed at least in part in parallel with one or more other ones of the steps. Additional or alternative steps can be used to implement other algorithms for adaptive flow control in other embodiments.

It is to be appreciated that the features and functionality as described above are presented by way of illustrative example only, and are not limiting in any way. Other adaptive flow control arrangements can be used in other embodiments.

The above-described example adaptive flow control arrangements advantageously provide improved storage system performance by allowing the storage system to adapt to variations in both short-term and long-term conditions.

Each of the other processing devices 108 is assumed to be similarly configured to processing device 108-1 as described above and elsewhere herein. Accordingly, each of the other processing devices 108 is configured to support adaptive flow control with multiple feedback loops as disclosed herein.

In some embodiments, each of the processing devices 108 incudes its own system manager 216, performance monitor 218 and adaptive flow control module 220. However, in other embodiments, it is possible that such components are implemented on only one of the processing devices 108, or on other subsets of the processing devices 108, in which case a system manager 216, performance monitor 218 and adaptive flow control module 220 implemented on one of the processing devices 108 may provide similar system management, performance monitoring and adaptive flow control functionality for one or more other ones of the processing devices 108. It is therefore possible that one or more of the processing devices 108 may not include its own instances of system manager 216, performance monitor 218 and/or adaptive flow control module 220. Also, although system manager 216, performance monitor 218 and adaptive flow control module 220 are illustratively shown as executing on a separate core 210-0 in this embodiment, this is by way of example only, and in other embodiments, one or more of these components may each be distributed over multiple ones of the cores 210.

In some embodiments, storage system 105 may comprise a separate processing device that executes the system manager 216 and manages the truck threads 224 executing on the cores 210 of the processing devices 108 of the nodes 106.

Accordingly, in some embodiments, the execution and implementation of system manager 216, performance monitor 218 and/or adaptive flow control module 220 may be distributed across multiple cores 210, processing devices 108, and/or nodes 106.

In some embodiments, the system manager 216, performance monitor 218 and adaptive flow control module 220 collectively monitor the core utilization of one or more of the processing devices 108 and may dynamically control and change the modes in which the truck threads 224 and other application threads 226 operate in order to adapt the storage system 105 to actual usage patterns of the users associated with the host devices 102.

These and other embodiments can utilize various techniques for disabling and re-enabling threads, including those disclosed in U.S. patent application Ser. No. 16/162,471, filed Oct. 17, 2018 and entitled "Dynamic Multitasking for Distributed Storage Systems," which is incorporated by reference herein in its entirety.

In some embodiments, a storage system comprises a distributed content addressable storage (CAS) system configured to support adaptive flow control using multiple feedback loops as disclosed herein. A distributed CAS system is also referred to herein as a clustered CAS system. A "distributed CAS system" as that term is broadly used herein includes any CAS system that is distributed across multiple storage nodes, such as the nodes 106 of storage system 105.

An illustrative embodiment of such a CAS system will now be described with reference to FIG. 5. In this embodiment, a CAS system 505 comprises a plurality of storage devices 506 and an associated storage controller 508. The CAS system 505 may be viewed as a particular implementation of the storage system 105, and accordingly is assumed to be coupled to host devices 102 via network 104 in system 100.

The storage controller 508 in the present embodiment is configured to support adaptive flow control functionality of the type previously described in conjunction with FIGS. 1 through 4. For example, the CAS system 505 illustratively interacts with one or more host devices 102 to support performance of a process such as that shown in FIG. 3, in order to provide adaptive flow control using multiple feedback loops on processing cores of the storage controller 508 in the CAS system 505.

The storage controller 508 includes distributed modules 516, 518 and 520, which are configured to operate in a manner similar to that described above for respective system manager 216, performance monitor 218 and adaptive flow control module 220 of the processing device 108-1 of system 100. Module 516 is more particularly referred to as distributed system management logic, and illustratively comprises multiple system management logic instances on respective ones of a plurality of distinct nodes, with the multiple system management logic instances collectively supporting performance monitoring mechanisms, adaptive flow control mechanisms and other functionality as disclosed herein. Module 518 more particularly comprises distributed performance monitoring logic with different instances thereof being implemented on respective ones of the distinct nodes. Similarly, module 520 more particularly comprises distributed adaptive flow control logic with different instances thereof also being implemented on respective ones of the distinct nodes.

Figure 5:
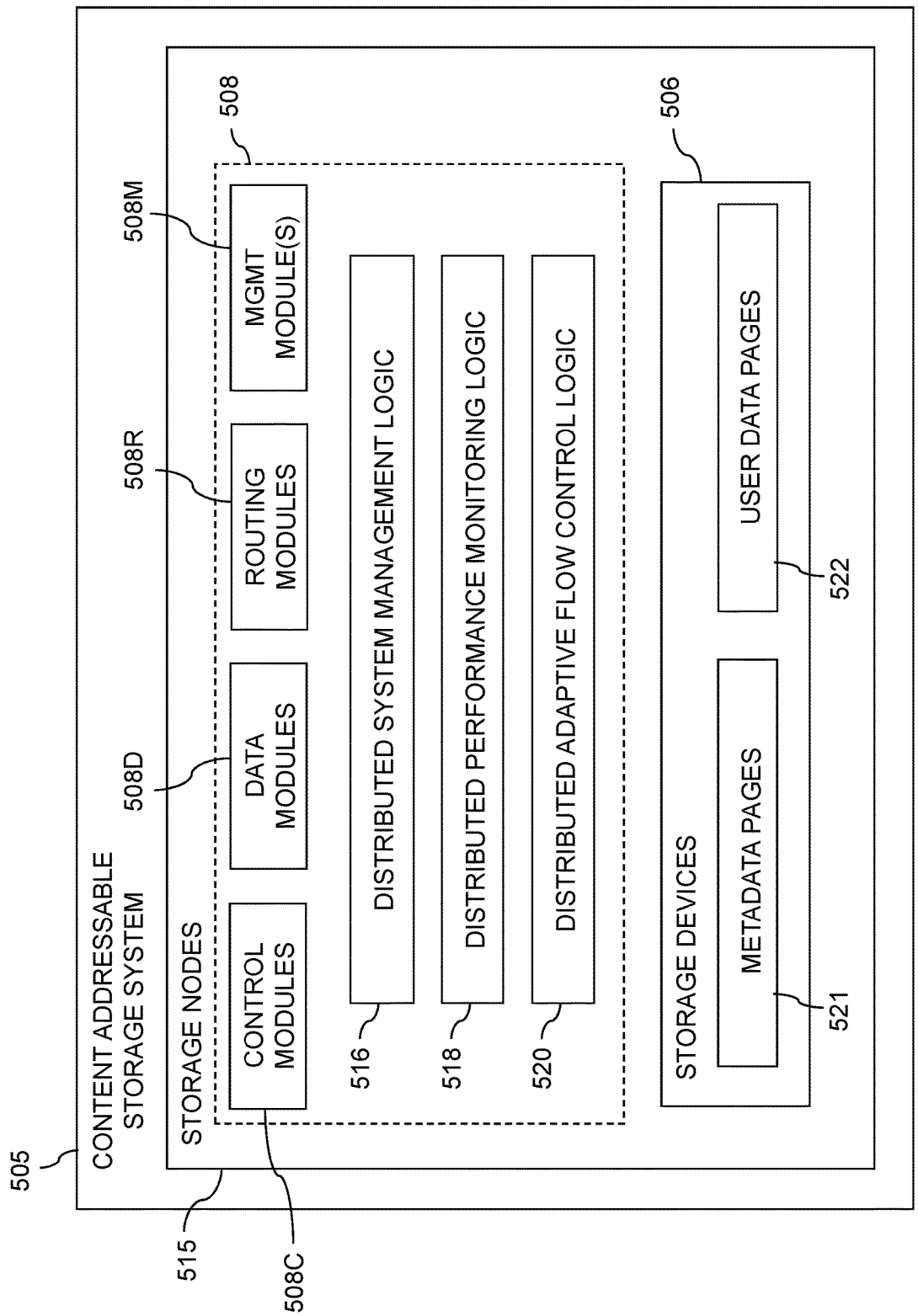
FIG. 5 shows a content addressable storage system having a distributed storage controller configured to implement adaptive flow control using multiple feedback loops in an illustrative embodiment.

The CAS system 505 in the FIG. 5 embodiment is implemented as a distributed storage system and illustratively includes a plurality of storage nodes 515 each comprising a corresponding subset of the storage devices 506. Such storage nodes 515 are examples of the "distinct nodes" referred to above, and other distributed or clustered storage system arrangements comprising multiple storage nodes and possibly additional or alternative nodes can be used in other embodiments. A given distributed or clustered storage system may therefore include not only storage nodes 515 but also additional storage nodes, compute nodes or other types of nodes coupled to network 104. Alternatively, such additional storage nodes may be part of another distributed or clustered storage system of the system 100. Each of the storage nodes 515 of the CAS system 505 is assumed to be implemented using at least one processing device comprising a processor coupled to a memory.

The storage controller 508 of the CAS system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 is referred to as distributed storage controller 508.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the CAS system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515. A given set of processing modules implemented on a particular one of the storage nodes 515 therefore illustratively includes at least one control module 508C, at least one data module 508D and at least one routing module 508R, and possibly a management module 508M.

Communication links may be established between the various processing modules of the distributed storage controller 508 using well-known communication protocols such as TCP/IP and RDMA. For example, respective sets of IP links used in data transfer and corresponding messaging could be associated with respective different ones of the routing modules 508R.

Although shown as separate modules of the distributed storage controller 508, the modules 516, 518 and 520 in the present embodiment are assumed to be distributed at least in part over at least a subset of the other modules 508C, 508D, 508R and 508M of the storage controller 508. Accordingly, at least portions of the storage system functionality of the modules 516, 518 and 520 may be implemented in one or more of the other modules of the storage controller 508. In other embodiments, the modules 516, 518 and 520 may be implemented as stand-alone modules of the storage controller 508.

The storage devices 506 are configured to store metadata pages 521 and user data pages 522, and may also store additional information not explicitly shown such as checkpoints and write journals. The metadata pages 521 and the user data pages 522 are illustratively stored in respective designated metadata and user data areas of the storage devices 506. Accordingly, metadata pages 521 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 521 and the user data pages 522.

The user data pages 522 are part of a plurality of LUNs configured to store files, blocks, objects or other arrangements of data, each also generally referred to herein as a "data item," on behalf of users of the CAS system 505. Each such LUN may comprise particular ones of the above-noted pages of the user data area. The user data stored in the user data pages 522 can include any type of user data that may be utilized in the system 100. The term "user data" herein is therefore also intended to be broadly construed.

A given storage volume for which content-based signatures are generated in the CAS system 505 illustratively comprises a set of one or more LUNs, each including multiple ones of the user data pages 522 stored in storage devices 506.

The CAS system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 522. The hash metadata generated by the CAS system 505 is illustratively stored as metadata pages 521 in the metadata area. The generation and storage of the hash metadata is assumed to be performed under the control of the storage controller 508.

Each of the metadata pages 521 characterizes a plurality of the user data pages 522. For example, in a given set of n user data pages representing a portion of the user data pages 522, each of the user data pages is characterized by a LUN identifier, an offset and a content-based signature. The content-based signature is generated as a hash function of content of the corresponding user data page. Illustrative hash functions that may be used to generate the content-based signature include the well-known SHA1 secure hashing algorithm, or other secure hashing algorithms known to those skilled in the art, including SHA2, SHA256 and many others. The content-based signature is utilized to determine the location of the corresponding user data page within the user data area of the storage devices 506.

Each of the metadata pages 521 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 521 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 505 is illustratively distributed among the control modules 508C.

The storage system functionality provided at least in part by modules 516, 518 and 520 in this embodiment is assumed to be distributed across multiple distributed processing modules, including at least a subset of the processing modules 508C, 508D, 508R and 508M of the distributed storage controller 508.

For example, the management module 508M of the storage controller 508 may include a system management logic instance that engages corresponding system management logic instances in all of the control modules 508C and routing modules 508R in order to support adaptive flow control using multiple feedback loops, as well as other related storage system functionality, within the CAS system 505.

In some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," each incorporated by reference herein in its entirety.

The distributed storage controller 508 in this example is configured to group consecutive pages into page groups, to arrange the page groups into slices, and to assign the slices to different ones of the control modules 508C. For example, if there are 1024 slices distributed evenly across the control modules 508C, and there are a total of 16 control modules in a given implementation, each of the control modules "owns" 1024/16=64 slices. In such arrangements, different ones of the slices are assigned to different ones of the control modules 508C such that control of the slices within the storage controller 508 of the CAS system 505 is substantially evenly distributed over the control modules 508C of the distributed storage controller 508.

The data modules 508D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 508C but are accessed using the data modules 508D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 505 each illustratively comprise one or more IO operations directing that at least one data item of the CAS system 505 be written to in a particular manner. A given write request is illustratively received in the CAS system 505 from a host device over a network. In some embodiments, a write request is received in the distributed storage controller 508 of the CAS system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 508C, data modules 508D and routing modules 508R of the storage nodes 515 communicate with one another over a high-speed internal network such as an InfiniBand network. The control modules 508C, data modules 508D and routing modules 508R coordinate with one another to accomplish various IO processing tasks.

The write requests from the host devices identify particular data pages to be written in the CAS system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The processing modules of distributed storage controller 508 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of hash-to-physical ("H2P") mapping tables may be used in addition to or in place of the above-noted HMD and PLB tables.

In some embodiments, certain ones of the above-described mapping tables are maintained by particular modules of distributed storage controller 508. For example, the mapping tables maintained by the control modules 508C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The CAS system 505 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 505. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 506. This is also referred to as physical layer mapping.

Examples of these and other metadata structures utilized in illustrative embodiments were described above. These particular examples illustratively include respective A2H, H2D, HMD and PLB tables. In some embodiments, the A2H and H2D tables are utilized primarily by the control modules 508C, while the HMD and PLB tables are utilized primarily by the data modules 508D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 505. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 505 correspond to respective physical blocks of a physical layer of the CAS system 505. The user data pages of the logical layer are organized by LBA and have reference via respective content-based signatures to particular physical blocks of the physical layer.

Each of the physical blocks has an associated reference count that is maintained within the CAS system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement adaptive flow control using multiple feedback loops in a distributed storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein in its entirety. Alternative arrangements of these and other storage node processing modules of a distributed storage controller in a CAS system can be used in other embodiments.

Illustrative embodiments of a storage system with dynamic flow control using multiple feedback loops as disclosed herein can provide a number of significant advantages relative to conventional arrangements.

For example, such embodiments are highly stable and adaptive to both short-term and long term variations in IO patterns and other conditions.

Some embodiments disclosed herein are advantageously configured to facilitate provision of effective average latency guarantees for IO operations in a storage system in which one or more processing cores of the storage system are used to execute multiple threads possibly from different applications of different types.

These and other illustrative embodiments can allow a given storage system to provide limited latencies or other performance guarantees in processing IO operations of one or more applications while also achieving higher levels of processing throughput than would otherwise be possible.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and/or storage systems incorporating adaptive flow control will now be described in greater detail with reference to FIGS. 6 and 7. Although described in the context of information processing system 100, these processing platforms may also be used to implement at least portions of other information processing systems in other embodiments.

Figure 6:
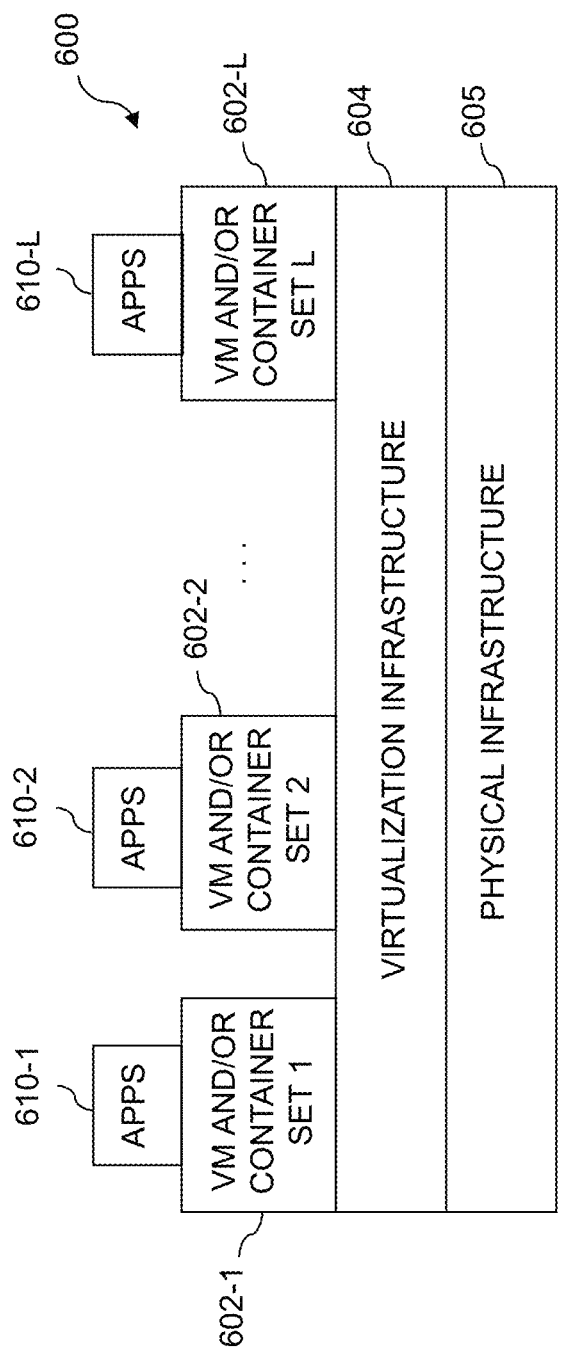
FIGS. 6 and 7 show examples of processing platforms that may be utilized to implement at least a portion of an information processing system in illustrative embodiments.
Figure 7:
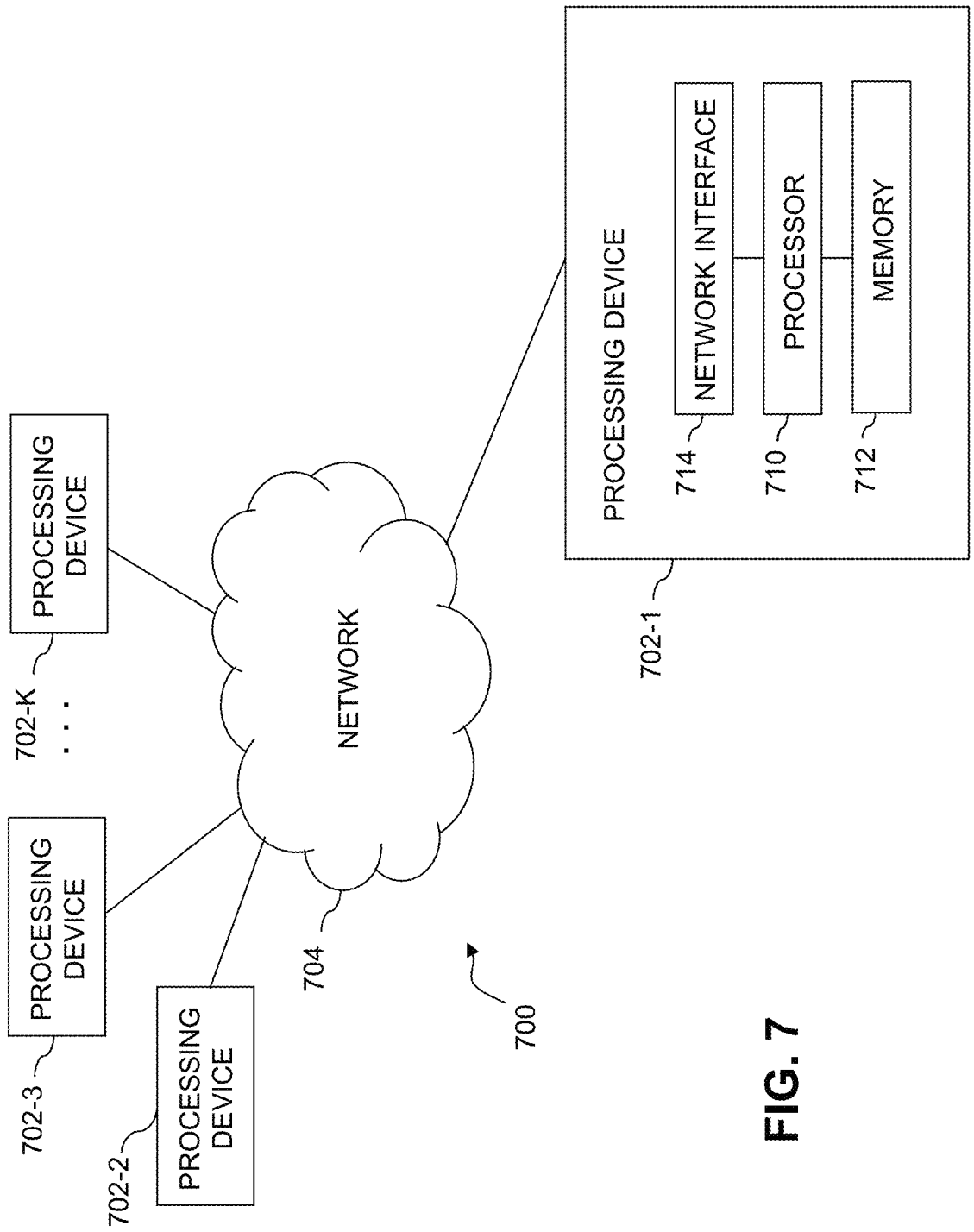

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide or otherwise utilize adaptive flow control techniques of the type described above using one or more processes running on a given one of the VMs. For example, each of the VMs can implement at least portions of one or more adaptive flow control modules with multiple feedback loops configured to perform an adaptive flow control algorithm as disclosed herein in the storage system 105 of system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide or otherwise utilize adaptive flow control techniques of the type described above. For example, a container host device supporting multiple containers of one or more container sets can implement at least portions of one or more adaptive flow control modules with multiple feedback loops configured to perform an adaptive flow control algorithm as disclosed herein in the storage system 105 of system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 702-1 in the processing platform 700 comprises a processor 710 coupled to a memory 712.

The processor 710 may comprise a single-core or multi-core CPU, a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of dynamic flow control using multiple feedback loops as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processing cores, threads, schedulers, applications, system management logic instances, performance monitoring logic instances, adaptive flow control logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to implement adaptive flow control in conjunction with processing of input-output operations in a storage system;
the adaptive flow control comprising a first feedback loop in which a window size defining an amount of concurrent processing of the input-output operations in the storage system is adjusted responsive to a measured latency for processing of one or more of the input-output operations;
the adaptive flow control further comprising a second feedback loop in which at least one latency threshold used to control adjustment of the window size in the first feedback loop is adjusted;
wherein said at least one processing device configured to implement the adaptive flow control comprising the first and second feedback loops is part of the storage system.

2. The apparatus of claim 1 wherein the storage system comprises a distributed storage system comprising a plurality of storage nodes.

3. The apparatus of claim 2 wherein said at least one processing device comprises at least one processing core of a multi-core storage node of the distributed storage system.

4. The apparatus of claim 1 wherein the first feedback loop is configured to decrease the window size responsive to the measured latency being greater than an upper latency threshold and to increase the window size responsive to the measured latency being less than a lower latency threshold.

5. The apparatus of claim 1 wherein the measured latency for processing of one or more of the input-output operations comprises an average end-to-end latency measured across multiple ones of the input-output operations.

6. The apparatus of claim 1 wherein the window size defines a maximum permitted amount of concurrent processing of the input-output operations in the storage system in terms of a number of data units of a particular size.

7. The apparatus of claim 1 wherein the first feedback loop is configured to respond to relatively short-term fluctuations in processing performance of the storage system and the second feedback loop is configured to respond to relatively long-term fluctuations in processing performance of the storage system.

8. The apparatus of claim 1 wherein the first feedback loop comprises a primary feedback loop of the adaptive flow control and the second feedback loop comprises an external feedback loop of the adaptive flow control and is configured to adjust said at least one latency threshold of the primary feedback loop.

9. The apparatus of claim 1 wherein the second feedback loop adjusts said at least one latency threshold of the first feedback loop based at least in part on a designated throughput measure.

10. The apparatus of claim 9 wherein the designated throughput measure comprises average input-output operations per second measured over a relatively long-term interval as compared to a relatively short-term interval over which the measured latency utilized in the first feedback loop is determined.

11. The apparatus of claim 1 wherein the second feedback loop operates over a plurality of cycles each corresponding to a designated feedback time frame for which the second feedback loop determines whether or not said at least one latency threshold of the first feedback loop is to be adjusted.

12. The apparatus of claim 11 wherein for each of the designated feedback time frames, the second feedback loop determines a plurality of measured parameters including average latency, latency deviation and average input-output operations per second for the feedback time frame.

13. The apparatus of claim 12 wherein for a given one of the feedback time frames, the second feedback loop does one of the following:
decreases said at least one latency threshold of the first feedback loop if the average latency is greater than a predefined average latency threshold or the latency deviation is greater than a predefined latency deviation threshold;
increases said at least one latency threshold of the first feedback loop if said at least one latency threshold was increased for a previous feedback time frame and the average input-output operations per second is more than a threshold amount greater than the average input-output operations per second for the previous feedback time frame; or
leaves said at least one latency threshold unchanged.

14. The apparatus of claim 12 wherein responsive to a designated number of consecutive cycles in which said at least one latency threshold remains unchanged, the second feedback loop automatically increases said at least one latency threshold.

15. A computer program product comprising a non-transitory processor-readable storage medium having stored therein program code of one or more software programs, wherein the program code when executed by at least one processing device comprising a processor coupled to a memory, causes said at least one processing device:
to implement adaptive flow control in conjunction with processing of input-output operations in a storage system;
the adaptive flow control comprising a first feedback loop in which a window size defining an amount of concurrent processing of the input-output operations in the storage system is adjusted responsive to a measured latency for processing of one or more of the input-output operations;
the adaptive flow control further comprising a second feedback loop in which at least one latency threshold used to control adjustment of the window size in the first feedback loop is adjusted;
wherein said at least one processing device that implements the adaptive flow control comprising the first and second feedback loops is part of the storage system.

16. The computer program product of claim 15 wherein the first feedback loop is configured to respond to relatively short-term fluctuations in processing performance of the storage system and the second feedback loop is configured to respond to relatively long-term fluctuations in processing performance of the storage system.

17. The computer program product of claim 15 wherein the second feedback loop adjusts said at least one latency threshold of the first feedback loop based at least in part on a designated throughput measure, and wherein the designated throughput measure comprises average input-output operations per second measured over a relatively long-term interval as compared to a relatively short-term interval over which the measured latency utilized in the first feedback loop is determined.

18. A method comprising:
 implementing adaptive flow control in conjunction with processing of input-output operations in a storage system;
 the adaptive flow control comprising a first feedback loop in which a window size defining an amount of concurrent processing of the input-output operations in the storage system is adjusted responsive to a measured latency for processing of one or more of the input-output operations;
 the adaptive flow control further comprising a second feedback loop in which at least one latency threshold used to control adjustment of the window size in the first feedback loop is adjusted;
 wherein the method is performed by at least one processing device that is configured to implement the adaptive flow control comprising the first and second feedback loops and is part of the storage system.

19. The method of claim 18 wherein the first feedback loop is configured to respond to relatively short-term fluctuations in processing performance of the storage system and the second feedback loop is configured to respond to relatively long-term fluctuations in processing performance of the storage system.

20. The method of claim 18 wherein the second feedback loop adjusts said at least one latency threshold of the first feedback loop based at least in part on a designated throughput measure, and wherein the designated throughput measure comprises average input-output operations per second measured over a relatively long-term interval as compared to a relatively short-term interval over which the measured latency utilized in the first feedback loop is determined.

\* \* \* \* \*